United States Patent [19]

Wolfer et al.

[11] Patent Number: 4,800,760

[45] Date of Patent: Jan. 31, 1989

[54] FORCE MEASURING DEVICE WITH AN ELECTROMECHANICAL TRANSDUCER

[75] Inventors: Peter Wolfer, Kleinandelfingen; Georges Schaffner; Jean-Jacques Schmid, both of Pfäffikon, all of Switzerland

[73] Assignee: Kistler Instrumente AG, Winterthur, Switzerland

[21] Appl. No.: 98,206

[22] Filed: Sep. 18, 1987

[30] Foreign Application Priority Data

Sep. 18, 1986 [EP] European Pat. Off. ............ 86112831

[51] Int. Cl.[4] ................................................. G01L 1/16
[52] U.S. Cl. ................................. 73/862.68; 73/862.06
[58] Field of Search ........... 73/862.68, 862.06, 862.54, 73/768, 781

[56] References Cited

U.S. PATENT DOCUMENTS 4,412,456 11/1983 Wilhelm et al. ............. 73/862.06 X
4,730,497 3/1988 Rabensteiner et al. ........... 73/768 X

FOREIGN PATENT DOCUMENTS 2700342 7/1977 Fed. Rep. of Germany .
3407618 9/1985 Fed. Rep. of Germany .

Primary Examiner—Jerry W. Myracle
Attorney, Agent, or Firm—Barnes & Thornburg

[57] ABSTRACT

A force measuring device includes a transducer mounted on a screw spindle, having force introducing elements interacting directly with the inside taper of a cylindrical sleeve to brace the device in a hold and preload the transducer. The screw spindle is displaced by a moving nut which is guided radially in the sleeve and supported axially at both sides. For bracing the device in a hole, mechanisms are provided for holding the force measuring device in a defined axial position and angle of rotation and for actuating the moving nut. These mechanisms do not extend beyond the outside diameter of the sleeve.

20 Claims, 10 Drawing Sheets

FORCE MEASURING DEVICE WITH AN ELECTROMECHANICAL TRANSDUCER

BACKGROUND AND SUMMARY OF THE INVENTION

The invention relates to a force measuring device with an electromechanical transducer for measuring the effects of force in a mechanically loaded machine component or the like. The device can be fitted in a hole in the machine component and braced non-positively, at the same time preloading the transducer.

Force measuring devices with electromechanical transducers are in themselves well known, for example, U.S. Pat. No. 4,412,456, and DE-A-No. 3,407,620. They serve mainly to detect partial forces or material strains in a mechanically loaded machine component, and give an electrical signal which is a measure of the force acting on the component. Piezoelectric transducers, especially those with quartz crystal elements, are employed preferentially in such measuring devices by virtue of their high sensitivity. They can also be used in places where only relatively small partial forces occur.

In DE-A-No. 3,407,620, a force measuring device with a piezoelectric transducer is described, which is inserted into a hole in the machine component in the manner described above and can be braced in it. It has two coaxial sleeves partly slotted longitudinally and able to move axially in relation to each other in the manner of straddling dowel. To make this possible, the need of the inner sleeve lying deeper in the hole has a conical surface which presses against the other sleeve. In the zone of the conical surface, the need sleeve has two plane parallel surfaces with the piezoelectric transducer gripped between them. When one sleeve is pushed into the other, the legs of the outer sleeve divided by longitudinal slots are forced apart by the wedge action on the conical surface, fixing the measuring device non-positively on the sides of the hole. In addition the outer sleeve has a head which is intended to rest on the outside of the machine component or to lie in an extension of the hole mouth as counter-support for a tensioning nut.

The design of this measuring device is relatively complicated and demands considerable outlay of material and manufacturing resources. For example, the mounting of the piezolelectric transducer requires plane-parallel surfaces on the inside of the inner sleeve. For satisfactory force introduction avoiding force shunting and bending moments, the legs of the inner sleeve with the plane surfaces must be very elastic and relatively long for example. The length of the longitudinal slots influences the overall length of the measuring device. On account of the head provided, the outer sleeve is manufactured from solid material.

The arrangement of the piezoelectric transducer between plane-parallel surfaces on the inner sleeve has the disadvantage that a defined position of the line of action of the force to be introduced into the transducer is hardly attainable. If this line of action is eccentric or at an oblique angle to the transducer axis, bending moments occur which under circumstances may be highly detrimental to the performance of the transducer. In the embodiments according to DE-A-No. 3,407,620, the relative position of the line of action of the force introduction depends on various dimensional tolerances. On the one hand the transducer has no defined position in the direction of the longitudinal axis of the measuring device, and on the other hand the relative positions of the two sleeves are not defined in the axial direction. With the design having a conical surface on the inner sleeve, the axial position of the edge of the outer sleeve, which presses on the conical surface and introduces the force onto the inner sleeve, may vary according to the deviations of the crucial dimensions of the two sleeves around the cone from the nominal dimensions.

In another embodiment of DE-A-No. 3,407,620, a grub screw fitted in a female thread of the outer sleeve is employed as screw Connection, pressing against the inner sleeve to generate the axial tension. With this design, the angle of rotation of the transducer is undetermined and cannot be verified from outside.

To remove the force measuring device from its hole if its replacement becomes necessary, or to move the device within the hole from one angle of rotation to another, the fixing of the measuring device ought to be easily releasable. Among other things the ability to move the measuring device is desirable where the direction of the force action in the machine component is not known or known only inexactly at first, and the transducer must be adjusted to maximum output signal by repeated temporary fixing at different angles of rotation before finally fixing the measuring device. With self-locking fixing, the known embodiments can be released only by applying impacts to the inner sleeve, and then only if the end of the inner sleeve sustaining the blow is accessible. However this procedure may harm the transducer. For a non-self-locking fastening on the other hand, a lower transmission ratio must be accepted for the force conversion on the conical surface, so that higher tension forces must be applied on the screw connection between the two sleeves.

An object of this invention is to create a force measuring device of the kind named at the outset but lacking the disadvantages described, of simpler and more compact design, less expensive, allowing the use of commercially available series manufactured quartz crystal transducers of miniature size and capable of being fitted in a hole in any axial position at any angle of rotation.

These objects are attained according to the invention by an essentially cylindrical sleeve forming its outer enclosure and having an inside taper at one end; by the transducer being connected with a screw spindle arranged coaxially inside the sleeve, by a screw device, held rotatable but axially immovable in the sleeve for moving the screw spindle axially in the sleeve and by the transducer having diametrically opposite force introduction elements which can be engaged directly with the inside taper of the sleeve to expand the sleeve and fix it.

According to a preferred development of the invention, arrangements are provided for holding the device in a defined axial position and/or rotation angle in relation to the hole, and arrangements for operating the screw drive. These arrangements do not exceed the radial dimensions of the sleeve essentially.

Another preferred development of the invention provides for each force introduction element to have a pressure sustaining body projecting radially from the transducer essentially and having an essentially hemispherical face engaging the inner taper.

The electromechanical transducer intended for use in the force measuring device according to the invention is preferably a piezoelectric transducer having its elements arranged typically in the form of quartz crystal platelets between pressure-sustaining bodies. The whole assembly is in a hermetically sealed housing with a tubular fixing extension having a male thread, through which the electrical connection lead from the transducer elements is led outside. The pressure-sustaining bodies, forming one part of the housing, have on the outside forming the force introduction surface either a hemispherical shape or plane-parallel force introduction surfaces on which the hemispheres rest. Alternatively, some other kind of electromechanical transducer may be used, such as a piezoresistive type.

For fixing the transducer on the screw spindle, the screw spindle, being hollow, may be given a female thread at its transducer end enabling it to be screwed onto the fixing extension of the transducer housing.

The sleeve may be produced from drawn tubing. The necessary operations are confined essentially to reaming the inside taper and preparing the contact points for fixing axially at both sides the moving nut provided for displacing the screw spindle axially. If necessary the sleeve may be provided additionally with longitudinal slots extending the length of the inside taper. For holding the moving nut axially at both sides, snap rings may be fitted into annular grooves on the sleeve. Under these circumstances, the sleeve may be relatively thin-walled, e.g. 1 mm wall thickness, especially if tightening of the inner taper is small, typically 1:10. With a larger inner taper and correspondingly greater sleeve wall thickness, the contact point nearer to the inner taper may also consist of a shoulder provided in the sleeve.

Force is introduced into the electromechanical transducer through hemispheres interacting directly with the inside taper of the sleeve. On the one hand a clear-cut force introduction largely independent of dimensional tolerances is obtained, while on the other hand the diameter of the measuring device, which ought to be restricted to a minimum, is determined solely by the radial dimensions of the transducer.

As a result of the direct action of the inside sleeve taper on the hemispheres of the piezoelectric transducer, the line of action of the force introduction does not coincide exactly with the geometrical axis of the transducer. Though this form of force introduction deviates from the ideal, it affects the performance of the transducer only insignificantly provided the inside taper is not tightened excessively. It has been demonstrated that the bending moments are to be expected with an inside taper not more than 1:5 are not detrimental to the transducer properties. Any shear forces are normally taken up by the transducer housing and do not affect the measurement.

On the other hand, it is possible with one and the same measuring device to register separately both compressive forces and tangentially directed shear forces. For this a transducer must be employed having elements for detecting compressive forces and also elements for detecting shear forces, and which, unlike the transducers described hitherto, transmits the introduced shear forces to the appropriate transducer elements. Piezoelectric transducers of this kind are known actually, and therefore require no further explanation.

The simple design proposed allows the measuring device to be produced in the minature size desired with relative little outlay. This measuring device needs no means to anchor it at the mouth of the hole in the machine component provided for its use. On the contrary, it is suited for so-called deep-hole installation and may be fixed in the hole at any depth. In the form of the moving nut held axially at both sides, it also has a means of releasing the taper lock easily after every fixing of the measuring device, so that this can be moved according to the particular requirements.

For mounting the measuring device, means are provided for holding it in a hole in a defined axial position and angle of rotating, and means for operating the moving nut. These means may consist, for example, of the moving nut having a coaxial and cylindrical extension projecting beyond the outer axial support of the moving nut and carrying a radial pin, a tool may be mounted on the radial pin for displacing the measuring device axially and for turning the moving nut. At least one plane contact surface at the outer end of the screw spindle allows a tool to be applied for fixing the angle of rotation of the screw spindle. Suitable as tools are two coaxial tubes shifting and turning inside each other, which can be introduced into the hole and have at one end operating handles and at the other end shaped parts which can be made to engage the appropriate adjusting elements on the measuring device.

To reduce the effect o the force shunt through the moving nut, this may be made of a material with a modulus of elasticity less than that of the electromechanical transducer, such as aluminium alloy or plastic. This feature will also damp the natural resonances of the transducer.

On commercially available piezoelectric transducers, the electrical lead connected with the transducer ground is normally led out insulated and grounded on the equipment for evaluating the electrical transducer signals. To avoid ground loops interfering with measuring, the transducer ground must be insulated electrically against the ambient ground, especially against the hole wall surrounding the measuring device in use. For this in the simplest case, a sleeve may be used for the measuring device consisting of electrically nonconducting material on at least its outside, for example with a surface coating of aluminium oxide. Other possibilities for ground insulation may be used.

The measuring electronics and evaluation logic connected to the transducer, comprising typically amplifiers, analog/digital converters and programmable storages, may be accommodated partially or wholly in the housing containing the transducer also, and/or in the extension tube attached to it, and thus integrated in the measuring device. This integration offers advantages particularly for applications where importance is attached to compact design of an overall system comprising a mechanical and electronic part, and to low susceptibility to interfering signals of typically electromagnetic nature. This is the case in a machine room for example.

Other objects, advantages and novel features of the present invention will become apparent from the following detailed description of the invention when considered in conjunction with the accompanying drawings.

DETAILED DESCRIPTION OF THE DRAWINGS

Figure 1:
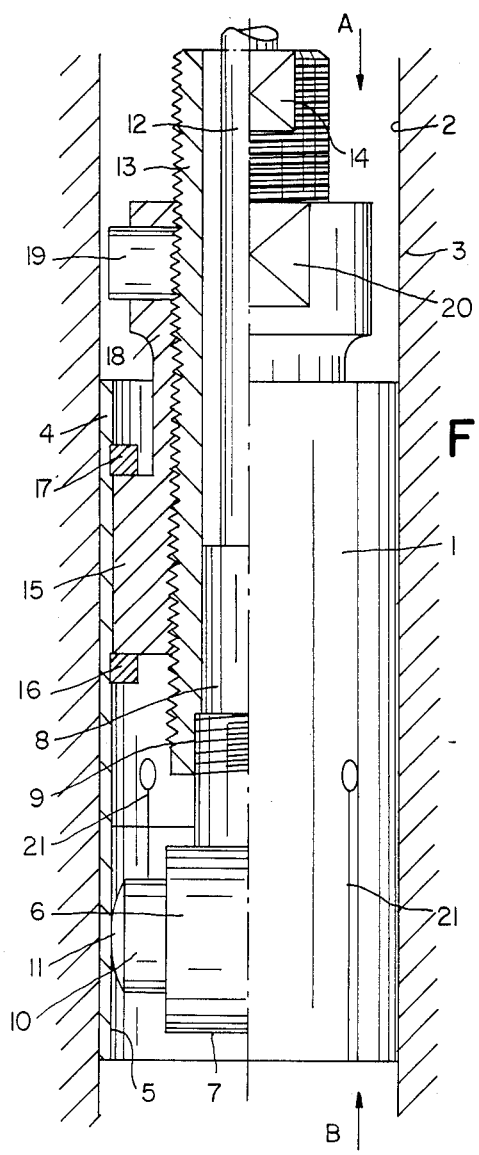
FIG. 1 is a partial cross section and view of a first embodiment of the measuring device fitted in a hole on a machine component.

The force measuring device 1, which according to FIG. 1, is inserted in a cylindrical hole 2 in a mechanically loaded machine component 3 which is to be monitored, such as a machine tool table. The force measuring device has an outer enclosure consisting of a thin-walled cylindrically sleeve 4 with an inside taper 5 at one end. The electromechanical transducer 6 consists of a hermetically sealed housing 7 accommodating the transducer elements, for example quartz platelets, to which a tubular mounting extension 8 with male thread 9 ajoins, and two diametrically opposite pressure-sustaining bodies 10 each with a hemisphere 11 for force introduction. The hemispheres 11 may be integral with the pressure-sustaining bodies 10 or attached thereto. The radius of the hemispheres 11 is preferably equal to the radius of the inside taper 5 of the sleeve 4 at the narrowest place. The electrical connecting line 12 is led out from the transducer through the cavity of the fixing extension 8. Piezoelectric transducers of this kind are commercially available from series production. Moreover as already mentioned, the housing 7 and/or extension 8 may accommodate the entire measuring electronics and evaluation logic or part thereof. Arranged coaxially inside the sleeve 4 is a screw spindle 13, which is screwed onto the male thread 9 of the fixing extension 8 and thus joined securely to the transducer 6. On the free end of the screw spindle 13 are two plane-parallel contact surfaces 14 for applying a tool (not shown), typically in the form of a socket wrench, so that the screw spindle 13 may be held from outside at a certain angle of rotation. A moving nut 15, supported axially at both sides on the inside of the sleeve 4, is screwed onto the screw spindle 13 to axially displace the screw spindle 13. In the first embodiment of the measuring device, the axial supports consist of two snap rings 16 and 17 in annular grooves on the sleeve 4. The moving nut 15 has a cylindrical extension 18 which projects beyond the outer axial support 17. This extension 18 carries a radial pin 19, to which a tool (not shown) may be applied for displacing the measuring device axially and for turning the moving nut. This tool may be a tube with a longitudinal slot, having at its point of application two optionally usable cross slots extending to both sides from the longitudinal slot, for seizing the pin 19. On the extension 18 of the moving nut there are also two plane-parallel contact surfaces 20 for applying another tool, used when the extension 18 projects from the hole 2 in the operating position of the measuring device.

By turning the moving nut 15 with one tool and securing the screw spindle 13 against turning with another tool, the screw spindle 13 can be displaced axially so that the transducer 6 is drawn into the sleeve 4 from the bottom and braced in the zone of the inside taper 5. The hemispheres 11 of the transducer 6 thereby interact directly with the inside taper 5 of the sleeve 4. In this way, the entire measuring device is fixed axially by friction grip between sleeve 4 and the side of the hole, and the transducer 6 is also preloaded. Where the sleeve is thin-walled, of draw steel tubing for example, its elasticity may be sufficient to transmit to the outside the tension, which is applied to the inside taper 5 only at two diametrically opposite points, without using excessive force. It is always possible to increase the elasticity of the sleeve in the taper zone in a familiar manner by longitudinal slots 21 extending at least over the length of the inside taper 5. The width of these longitudinal slots 21 must be narrow in relation to the radius of the hemispheres 11 of the transducers, so that the hemispheres cannot lodge in them. By turning the moving nut 15 in the reverse direction, the bracing of the measuring device can be released again quite easily.

Figure 3:
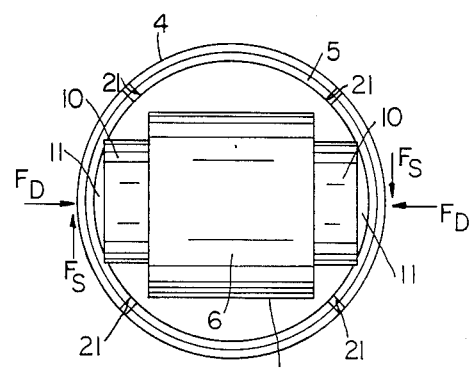
FIG. 3 is a view of the end elevation of the measuring device according to FIG. 1, in the direction of arrow B in FIG. 1.
Figure 2:
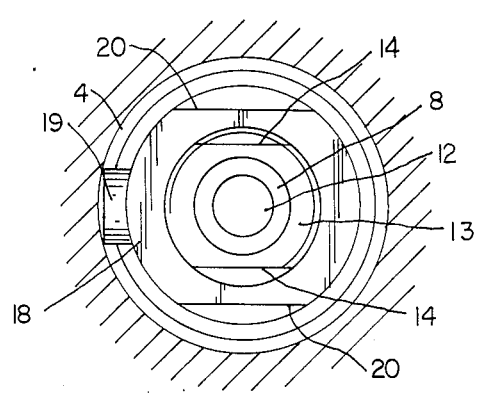
FIG. 2 is a view of the end of the measuring device in FIG. 1 in elevation, in the direction of arrow A in FIG. 1.
Figure 4:
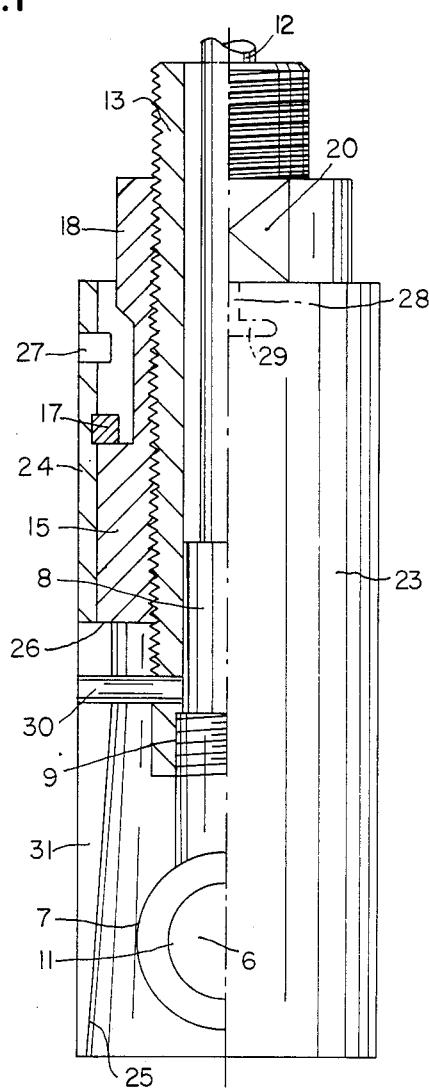
FIG. 4 is a partial cross sectional view of a second embodiment of the measuring device.

The second embodiment of the measuring device 23 according to FIG. 4 differs from those described above in that the sleeve 24 has a somewhat greater wall thickness, the axial support of the moving nut 15 is nearer to the inside taper 25 and consists of a shoulder 26 integral with the sleeve 24, and other means are provided for setting the measuring device. The other parts of the measuring device are essentially analogous to those in FIGS. 1 to 3 and have the same numbers.

To displace the force measuring device 23 axially and to fix the angle of rotation of the transducer 6, the sleeve 24 has at its end opposite to the inside taper 25 a radial pin 27, to which a tool may be applied. This tool is basically similar in form to that for engaging the point 19 on the first embodiments according to FIGS. 1 to 3. Alternatively it is possible to reverse the forms of the tool and setting arrangements. I this case, the sleeve 24 has a longitudinal slot 28 proceeding from the edge of it, and two lateral slots 29 (shown with dot-dashed lines) extending to each side of the longitudinal slot, while the tool has a radial pin to engage these slots. The screw spindle 13 with the transducer 6 is secured against turning in relation to the sleeve 24 by a pin 30, which is inserted radially at the transducer end of the screw spindle 13 and is guided in a longitudinal slot 31 in the sleeve 24. Analogous to the first embodiment, a cylindrical extension 18 of the moving nut 15 has two plane-parallel contact surfaces 20, enabling a tool to be applied for turning the moving nut 15. In contrast to the tools needed for the first embodiment, in this case the tool for turning the moving nut 15 can be arranged inside the tool for holding the measuring device. This facilitates handling the tools, because the handles of the turning tools are outside those of the holding tool.

In both embodiments described, the means provided on the measuring device for inserting it in a hole are configured so that their radial extent does not exceed the outside diameter of the sleeve. This makes the measuring device suitable for fitting in deep holes also. To fix the depth, the tool intended for holding the measuring device can be provided with a length scale on its outside.

As an alternative to the embodiments described, the inside taper of the sleeve may have the reverse direction, i.e. with its narrowest place at the end of the sleeve and widening inward.

As mentioned at the beginning, the insulation of the electromechanical transducer against ground may be accomplished in various ways. For example, the sleeve may include on the outside at least a wear-resistant coating of electrically nonconductive material, such as aluminium oxide. Another possibility is to fit the hemispheres separately on the pressure-sustaining bodies of the transducer and either make them of electrically nonconductive material or bond them to the pressure-sustaining bodies with electrically nonconductive adhesive, and to make the moving nut of electrically nonconductive material, at least on its outside.

The force measuring device may be used also where in addition to compressive forces $F_D$, tangential shear forces $F_S$ also (FIG. 3) are to be detected and measured individually. As already mentioned, for this an electromechanical transducer designed for the separate measurement of compressive and shear forces is to be provided. Furthermore in this case, a sleeve with longitudinal slots in the taper zone must be employed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A force measuring device for insertation into a hole of a mechanically loaded machine component comprising:
   a cylindrical sleeve means for forming an outer enclosure for said measuring device and having an inside taper at one end;
   an electromechanical transducer in said sleeve means for measuring forces;
   a screw spindle joined to said transducer coaxial to and in said sleeve means;
   a screw means axially fixed and rotatably mounted in said sleeve and engaging said screw spindle for moving said screw spindle axially; and
   a pair of diametrically opposed force introduction means on said transducer for engaging directly said inside taper of said sleeve means to expand said sleeve means thereby preloading said transducer and bracing said measuring device in said hole.

2. A force measuring device according to claim 1, including a first means for holding the device in a defined axial and angular position in said hole, and a second means for actuating the screw means, said first and second means having a radial dimension not exceeding the radial dimension of the sleeve means.

3. A force measuring device according to claim 1, wherein each force introduction means includes a pressure-sustaining body projecting essentially radially from the transducer and having an essentially hemispherical face engaging the inside taper of the sleeve means.

4. A force measuring device according to claim 3, wherein the radius of the hemispherical bodies on the pressure-sustaining bodies is substantially equal to half the diameter of the inside taper of the sleeve at its narrowest point.

5. A force measuring device according to claim 3, wherein said hemispherical bodies are joined separately to and are electrically insulated from the pressure-sustaining bodies of the transducer, and the screw means consist of electrically nonconductive material on at least its outside.

6. A force measuring device according to claim 1, wherein said transducer is a piezoelectric transducer.

7. A force measuring device according to claim 1, wherein said transducer is a piezoelectric transducer for detecting separately both compressive and tangentially acting shear forces.

8. A force measuring device according to claim 1, wherein said sleeve means is a drawn tubing.

9. A force measuring device according to claim 1, wherein the pitch of the inside taper is at least 1:5.

10. A force measuring device according to claim 1, wherein said sleeve means includes longitudinal slots extending at least the length of the inside taper.

11. A force measuring device according to claim 10, wherein the width of said longitudinal slots in the sleeve are small in relation to the radius of the hemispheres.

12. A force measuring device according to claim 1, wherein said sleeve means includes an annular groove with a snap ring inserted in it as at least one of two axial supports of the screw means.

13. A force measuring device according to claim 12, wherein the other axial support axial of the screw means consists of a shoulder on the interior of said sleeve means.

14. A force measuring device according to claim 1, wherein the screw means consists of a material with a modulus of elasticity lower than that of the transducer.

15. A force measuring device according to claim 1, wherein the electromechanical transducer means has a hermetically sealed housing.

16. A force measuring device according to claim 1 including insulating means for insulating the electromechanical transducer electrically from ground.

17. A force measuring device according to claim 16, wherein said insulating means includes the cylindrical sleeve means consisting of electrically nonconductive material on at least its outside wall.

18. A force measuring device according to claim 1, wherein: a said screw means includes a coaxial cylindrical extension projecting beyond an outer axial support of the screw means and a radial pin on said cylindrical extension, to which a tool may be applied for displacing the measuring device axially and for turning the screw means; and at least one plane contact surface on the outer end of the screw spindle, enabling a tool to be applied for fixing the angle of rotation of the screw spindle and the transducer.

19. A force measuring device according to claim 1, wherein: said sleeve means includes a radial pin, for applying a tool to displace the measuring device axially and to fix the angle of rotation of the transducer and secure screw spindle against turning in relation to the sleeve means; and said screw means having at least one plane contact surface, enabling a tool to be applied for turning the screw means.

20. A force measuring device according to claim 1, wherein said transducer in said sleeve means includes measuring electronics and evaluation logic.

* * * * *